June 8, 1954          E. HURST          2,680,335

ABRADING DEVICE AND METHOD OF MAKING

Filed Dec. 29, 1951          4 Sheets-Sheet 1

*INVENTOR.*
EDWARD HURST

BY *WJDoley*

*ATTORNEY*

June 8, 1954 E. HURST 2,680,335
ABRADING DEVICE AND METHOD OF MAKING
Filed Dec. 29, 1951 4 Sheets-Sheet 2

INVENTOR.
EDWARD HURST
BY
ATTORNEY

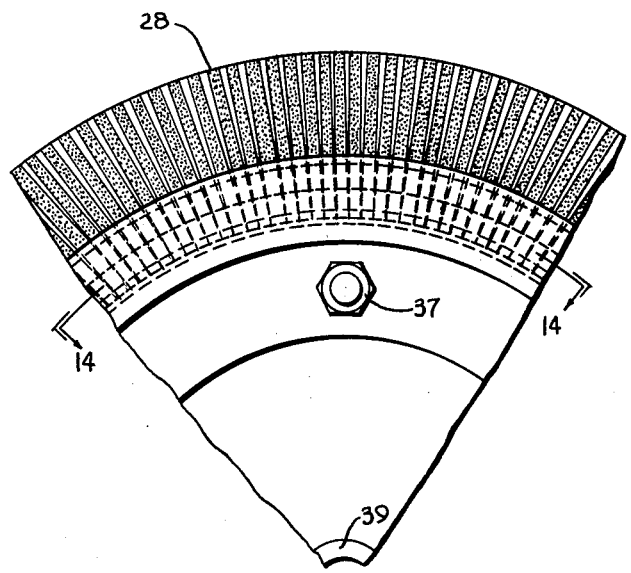
FIG. 13
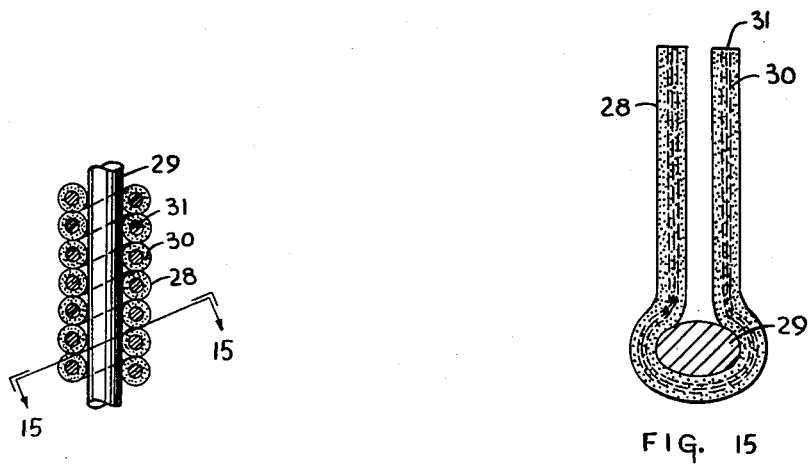
FIG. 14
FIG. 15
INVENTOR.
EDWARD HURST

June 8, 1954  E. HURST  2,680,335
ABRADING DEVICE AND METHOD OF MAKING
Filed Dec. 29, 1951  4 Sheets-Sheet 4

INVENTOR.
EDWARD HURST
BY *W J Doley*
ATTORNEY

Patented June 8, 1954

2,680,335

UNITED STATES PATENT OFFICE 2,680,335

ABRADING DEVICE AND METHOD OF MAKING

Edward Hurst, West Newton, Mass., assignor to United Cotton Products Company, Fall River, Mass., a corporation of Massachusetts Application December 29, 1951, Serial No. 264,130

18 Claims. (Cl. 51—193)

This invention relates to abrading devices and to methods of making them. More particularly, it is concerned with rotary annular and other abrasive shapes composed of abrasive-included fibrous sheet material and with methods of making the same.

The invention is especially applicable to the economical fabrication of rotary annular abrasive shapes and will therefore be primarily described as it is used to make such articles. However, it is subject to numerous modifications of practice whereby it is equally useful in the making of various other forms of abrasive articles, many of which will be pointed out later herein, and others of which will readily become apparent as the description proceeds.

There are many grinding and finishing operations which for best results, require the use of a grinding wheel of relatively large diameter. Such wheels are gradually worn down in use and soon reach the point where the reduction in diameter of the wheel is sufficient to adversely affect the grinding action of the wheel to the extent that the remainder of the wheel must be discarded. The elimination of the abrasive body from the central portion of the wheel has presented the problem of providing adequate strength in the resulting abrasive annulus so that the wheel can be used with a reasonable degree of safety at the high speeds of operation which are usually employed.

Abrasive wheels and other shapes composed of abrasive-included fibrous sheet material have heretofore been made by building up a plurality of superimposed layers or plies of the sheet material containing abrasive and compressing the assembly of sheets to the required density. However, the use of such methods, especially for making abrasive articles of annular shape and large diameter, is unsatisfactory because of the large waste of material involved in such methods of making the article. Consequently the cost of the final product has often been in excess of the amount which such an article would bear. Moreover, such methods do not yield themselves readily to the provision of reinforcements in the article. Numerous other disadvantages exist in making wheels and other shapes in accordance with methods heretofore offered.

It is an object of the present invention to provide a new form of abrasive article composed of abrasive-included fibrous sheet material.

It is another object to provide an abrasive article of large diameter and annular shape which will be of adequate strength and will be useable with a minimum of waste.

It is a further object to provide a method of making such articles which will involve a minimum of waste in the making of the article.

Other objects and advantages accruing from the practice of the present invention will become apparent as the description proceeds.

In accordance with the present invention an abrasive wheel, segment or other shape composed of abrasive-included fibrous sheet material is made by toroidally winding a continuous strip of abrasive-included fibrous sheet material about a mandrel or core which is usually temporary and is later removed after slitting the outer periphery of the toroidal windings. The abrasive-included fibrous strip material can be of any desired width and in the windings about the core can be overlapped to any desired extent. According to certain modifications of the invention the abrasive-included strip material can be subjected to pre-molding operations prior to its use as a toroidal winding, as will be explained more fully later. One or more plies or superimposed wrappings of the fibrous strip about the core can be made depending upon the thickness of abrasive body desired. The core or mandrel can be of any desired shape or contour depending upon the specific article to be made, and can be provided with depressions, knobs or other surface configurations in order to impart comparable form or shape to the abrasive body after the subsequent molding operation. Reinforcing elements can be incorporated in the mounting portion or in other portions, or throughout the annular abrasive body by assembling the desired reinforcing element or elements with the mandrel or core prior to wrapping and/or by the inclusion of a reinforcing element or elements simultaneously with the winding operation. When the core is removed, the reinforcing element or elements are left enclosed by the toroidally wound material. After the core has been removed the toroidally wound strip material is placed in a mold and subjected to sufficient heat and pressure to compact the material and form it into the desired shape. The upper and lower face plates of the mold are contoured to provide the desired shape to the molded abrasive article. For example, in making a large diameter annular abrasive ring of the types shown in Figures 1 to 6 of the drawing the upper and lower face plates of the mold are so contoured that the molded abrasive shape is somewhat thicker in that portion about the inner periphery of the shape whereby a mounting shoulder is provided on each side face of the article. The resulting annular abrasive shapes or units can be assembled singly or in multiple by means of suitable mounting flanges for rotation upon a shaft or spindle as in the case of the article shown, or otherwise mounted for use, depending upon the particular shape of molded article.

According to certain modified forms of my invention the entire toroidally wound assembly is not subjected to molding, but the mounting portion only of the assembly is molded, leaving the balance of the material in unmolded pliable or flexibe form.

In order to more clearly understand the nature of the present invention, reference is made to the drawings, in which Figure 1 is a side elevation of an abrasive article made in accordance with the present invention showing the article at an intermediate stage of its manufacture, and shows the details of the manner in which the abrasive-included fibrous strip material is toroidally wound about the reinforcing element and temporary core or mandrel;

Figure 13 is a fragmentary side view of the wheel shown in Figure 12;

Figure 14 is a top plan view looking down upon the periphery of a fragment of a single sector of the wheel shown in Figures 12 and 13;

Figure 15 is a sectional view through the line 15—15 of Figure 14; and

As previously stated, the abrasive body of the articles of the present invention is composed of an abrasive-included fibrous sheet material. One such material which I have found highly satisfactory for use in carrying out the present invention is that described more fully in my Patents Nos. 2,284,738 and 2,284,739. Briefly, the abrasive sheet material defined in the aforesaid patents, and which I have found to be satisfactory for making the present wheels, is composed of a plurality of carded fibrous membranes which have been superimposed one on the other and the fibers intertwined to form when compacted a strong, substantially non-lamellar fibrous web. During the process of forming the fibrous web material abrasive grain of the desired particle size, and adhesive binder, are incorporated internally of the web to form a sheet material which is abrasive in character throughout its thickness. In addition to the adhesive incorporated within the fibrous sheet material the material may, if desired, have a further application of the same or a different adhesive as a sizing coat. For further details of such abrasive sheet material and methods of making it, reference is made to my above-mentioned patents.

Figure 1:
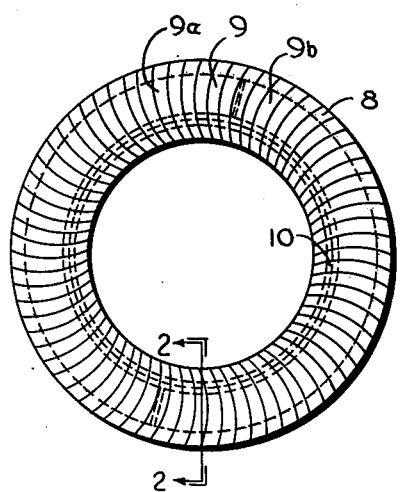
Figure 2:
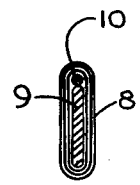
Figure 2 is a sectional view through the line 2—2 of Figure 1.
Figure 3:
Figure 3 is a sectional view similar to Figure 2 showing the assembly of material after the withdrawal of the temporary mandrel or core.
Figure 4:
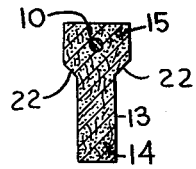
Figure 4 is a sectional view comparable to Figure 2 showing the same abrasive article in finished form.

Referring further to Figures 1, 2, 3 and 4 of the drawing, which show an article of the present invention in various stages of its manufacture, the present invention will be described as it is specifically applied to the making of annular abrasive rings or wheels of the type shown, and which are made in the following manner. An abrasive-included fibrous sheet material, such as that described in my aforementioned Patents Nos. 2,284,738 and 2,284,739, is first slit into long continuous strips of material of the desired width. For example, in making an annular abrasive wheel having an outside diameter of 16" and an inside diameter of 12" the abrasive-included sheet material can be slit into a strip ¾" wide, although the strip can be cut somewhat narrower or wider if desired. In making an annular abrasive body 16" in outside diameter and 12" inside diameter, in other words, having a radial depth of two inches, in accordance with the present invention the abrasive-included fibrous strip material 8 is toroidally wound about a core member 9 and a reinforcing wire ring 10, the windings overlapping to the extent desired. The number of circumferential windings will depend upon the desired thickness of the abrasive body. The annular core 9, which can be of wood, plastic, metal or any other structural material of adequate strength, consists of two semi-circular members 9a and 9b to provide a means of removal after the winding operation has been completed. Referring to Figure 3, after the abrasive-included fibrous sheet material has been tightly wound in toroidal fashion about the core 9 and reinforcing ring 10 the windings of abrasive-included strip material are severed at the outer periphery 12 and the mandrel or core pieces 9a and 9b removed, leaving the inner reinforcing ring 10 in position next to the inner periphery of the windings. The resulting annulus of toroidal windings is then placed in a suitable mold and subjected to a pressure of 3,000 pounds per square inch at a temperature of 260° F. for one-half hour which serves to compress the material together and unite it into a compact body 13 as shown in Figure 4.

Figure 16:
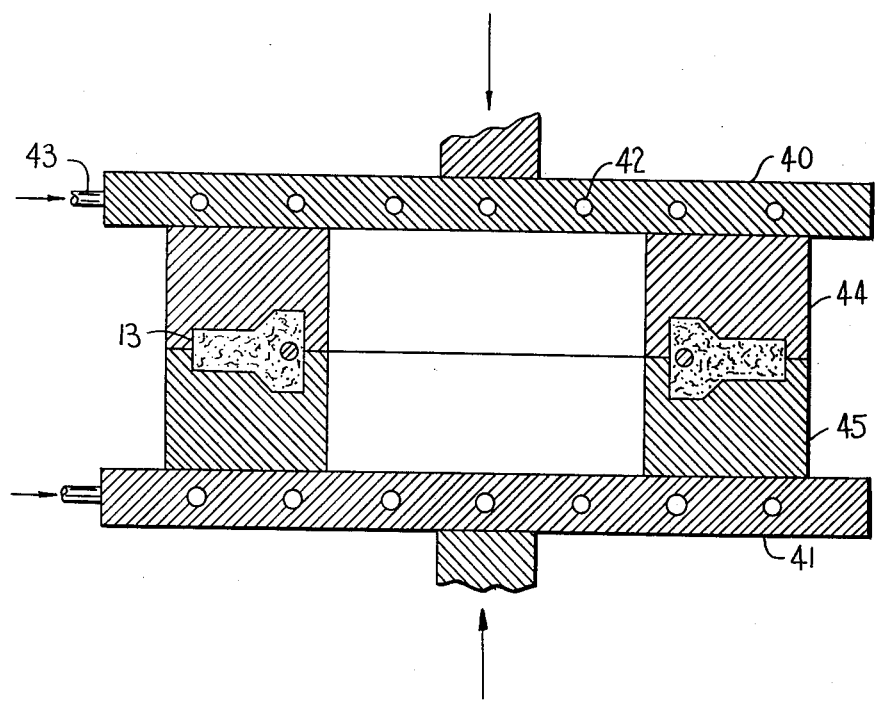
Figure 16 is a vertical section showing the molding under heat and pressure of an article of the present invention of the specific type shown in Figures 1 to 4.

This molding operation is illustrated by Figure 16 in which 13 is the compact annular abrasive body, 40 and 41 are the upper and lower platens, 42 is one of the steam heating ducts, 43 is the steam inlet to the heating ducts 42 of the upper platen 40, and 44 and 45 are the upper and lower sections of the mold. The abrasive-included fibrous sheet material under the combined action of the heat and pressure of the molding operation is capable of sufficient plastic flow to cause it to conform to the configurations of the mold and impart to the molded body the desired shape. The resulting compact body 13 of the annular wheel shown consists of an outer peripheral grinding or polishing portion 14 and an inner mounting portion 15 of somewhat greater thickness. The mounting portion of the resulting annular abrasive body contains the embedded wire ring 10 which serves to reinforce and strengthen the annular body.

Figure 5:
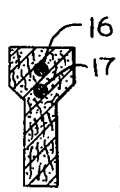
Figures 5 and 6 are similar views showing in cross-section the structure of modifications of the present device.

The reinforcing element 10 instead of consisting of a single wire as shown in Figures 1–4 may be composed of a plurality of wires such as provided in the molded shape shown in Figure 5 in which the mounting portion is reinforced with a pair of wires 16 and 17. Other reinforcing means may be used in place of single filament wires such as, for example, braided or corded metal wires. As a matter of fact, other materials than metal may be used for such reinforcing purposes although metal wires or ribbons have been found highly satisfactory for the purpose.

Figure 6:
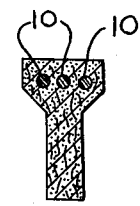

Figure 6 shows the type of article which can be made by a modification of the above-described procedure in which, instead of molding the final abrasive ring from a single toroidally wound unit the final article is formed by assembling two or more of the toroidally wound annular elements as above described in superimposed relation and subjecting them to pressure to compact them and unite the several individual units into a single compact body. For example, in Figure 6 the shape shown has been formed from three separate toroidally wound units each one of which contained a single wire reinforcing element 10. During the molding operation the three individual units become sufficiently blended together to form a single abrasive body as shown. When an article as shown in Figure 6 is made it has usually been found desirable to use a finer gauge reinforcing wire than is used in making an article composed of a single unit in order to avoid an overlapping or rubbing together of the individual wire reinforcing elements.

It can be seen from the above description that the present invention can be used to make abrasive wheels or rings of any desired thickness ranging from a thin wheel such as the type used for cutting off purposes to a thicker wheel such as the type used for snagging and other rough grinding operations. The thickness of the wheel will depend upon such variable factors as the number of individual toroidally wound sectors used to make up the final molded wheel, the number of individual toroidal windings in each sector and the extent to which those windings are overlapped in making the sector.

As a further modification of the hereinabove described method of making annular wheels of the present invention, instead of using a wooden or other temporary mandrel or core which must be later removed from the toroidally wound unit, a core member of expendable material which will not interfere or detrimentally affect the grinding action of the wheel and which can therefore be left in the abrasive body, can be used. For example, a core member composed of one or more plies of the same abrasive-included fibrous sheet material as the strip material can be died out in the form of an annulus of the required size.

Figure 11:
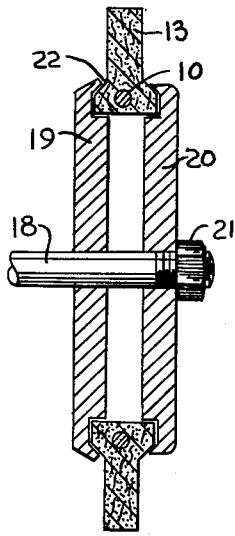
Figure 11 is a sectional view of a mounting assembly showing the manner in which an article of the present invention of the specific type shown in Figures 1 to 4, when used singly, is mounted between flanges for grinding operations.

Figure 11 shows the manner in which an annular abrasive wheel of the type herein described and shown in Figures 1 to 4 can be mounted for use. As shown, the abrasive annulus 13 is assembled between flanges 19 and 20 which are suitably arbored for mounting upon a rotating spindle or shaft 18. The assembly is held in position by the tightening of the end nut 21, so that the flanges come into close engagement with the shoulders 22 of the abrasive annulus. It is clearly evident from the construction shown that the abrasive annulus 13 is almost fully expendable since the wheel can be used down to a diameter slightly in excess of the outer diameter of flanges 19 and 20. The assembly can then be removed and the stub of abrasive material be removed and replaced by a new unit. The result is the provision of an article which is capable of almost total use without waste whereas in a similar use of an abrasive wheel of the same outside diameter and small arbor hole the entire central portion of the wheel must be discarded and is a total loss.

Figure 7:
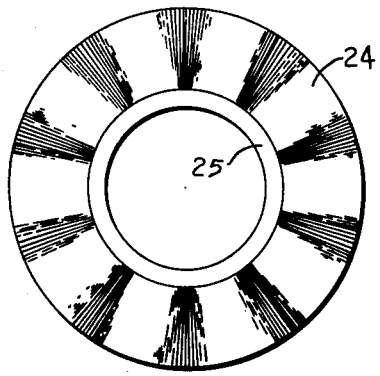
Figure 7 is a plan view of a modified form of abrasive ring made according to the present invention.
Figure 8:
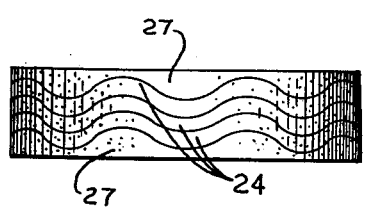
Figure 8 is a side elevation of a grinding wheel composed of several abrasive elements of the type shown in Figure 7.

As I have already pointed out in describing the molding operation, the abrasive-included fibrous sheet material when subjected to the heat and pressure of molding is capable of sufficient plastic flow to conform to the general shape or contour of the mold. This physical property of the material is taken full advantage of to provide a means for creating numerous modified forms of abrasive articles without departing from the spirit of the present invention. For example, a toroidally wound annulus of abrasive-included fibrous strip material similar to that shown in Figures 1 and 2 can be used to mold an article such as that shown in Figure 7 by compacting the material under heat and pressure in a mold provided with upper and lower face plates of a sinusoidal configuration so that when the article is molded at least the grinding or cutting portion 24 of the resulting annular ring is provided with a wavy surface. The periphery of the wheel is thus provided with a curved surface similar to a sine wave in character. The entire radial width of the abrasive annulus may be molded with such a sine curve but it is preferable to leave the inner portion or mounting head portion 25 of the ring flat so that the wheel can be suitably held between mounting clamps of standard design. Such wheels are highly suitable for assembling in multiple, as shown in Figure 8, since the sinusoidal side faces adapt themselves to nesting between side members 27 of similar composition molded with wavy contour on one side only so that they are held in firm relationship during operation by interlocking of the individual units with one another.

Abrasive bodies of other form such as saucer or cup-shaped wheels or rings can be similarly molded by the use of suitably shaped molds. Abrasive wheels can also be molded in which the outer periphery is provided with an irregular or toothed surface to provide a cutting action and wheel clearance in deep cutting operations comparable to that obtained with a saw.

Abrasive bodies can be made in which the grinding action is not limited or restricted to the peripheral face of the wheel but the sides of the wheel can be utilized for grinding. In fact annular abrasive bodies can be fabricated in accordance with the present invention and suitably mounted, as for example in a steel outer rim about the periphery of the wheel, using the inside perimeter of the body for grinding operations in which case very high operational speeds can be applied with a high degree of safety.

As a further modification of the present invention, the article in molding can be pressed in a mold provided with ribs or radial knives or dividing elements whereby in the molding operation the toroidally wound abrasive material is separated along radial lines into individual molded segments so that the peripheral portion of the wheel is discontinuous, the number of individual segments depending upon the particular type of article desired. These radial indentations or divisions about the wheel periphery can be extended any desired distance in from the outer periphery of the wheel or, if desired, the radial indentations or divisions can extend all the way in to the inner periphery of the ring so as to provide individual arc-shaped segments which can, particularly if the reinforcing ring is omitted from the molded body, be divided into segments which can then be used by mounting them upon a suitable backing to provide a grinding disc. The rigidity or flexibility of the resulting grinding disc will depend largely upon the thickness of the molded segment.

Figure 9:
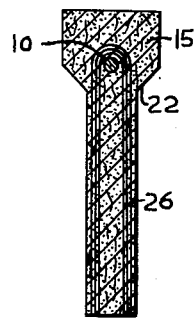
Figures 9 and 10 are sectional views comparable to Figure 4 showing further modifications of the present invention.

Figure 9 shows a further modification of the present invention in which, in addition to the annular reinforcing wire ring 10 in the mounting portion of the abrasive body, the article is provided with supplementary radial reinforcing elements in the form of smaller wire strands 26 which are incorporated in the wheel when the abrasive-included fibrous strip material is toroidally wound upon the mandrel by simultaneously winding the wire elements 26 with the windings of abrasive strip material. The number and character of these radial reinforcing elements 26 are subject to considerable variation. For example, in place of fine wire strands, nylon filaments, glass fiber cording, cotton threads or other natural or synthetic materials in filament, cord, or ribbon form which will provide additional strength to the finished article without interfering with the grinding action of the abrasive body, can be included in the article.

Figure 10:
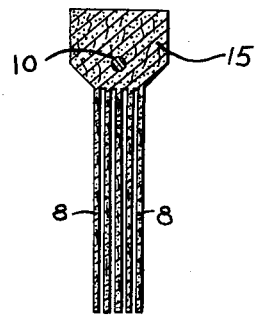

Figure 10 shows a still further modification of the present invention in which, instead of pressure molding an assembly such as shown in Figure 3 in entirety to form an article of the type shown in Figure 4, the compacting or molding operation is confined to the inner peripheral portion 15 only of the abrasive ring whereby the outer or working portion of the device is left uncompacted. Such an article is suitable for use as a permanently charged polishing or buffing device of the type suitable for use in operations which are usually performed by set-up or buffing wheels. The making of annular abrasive devices adapted for use as buffs or set-up wheels in accordance with the teachings of the present invention wherein the article is composed of toroidal windings of an abrasive-included fibrous material is subject to numerous modifications of practice. For example, the abrasive-included fibrous sheet material as provided in strip form for the toroidal winding operation can be first premolded with or without an internal reinforcing filament to form a long continuous strip of cord-like or other molded form which is then toroidally wound in a manner similar to the winding of the unmolded abrasive-included fibrous strip material used in making the wheels described earlier herein. Also, the core about which the abrasive-included fibrous strip material is wound can take the form of an endless belt whereby the abrasive-included fibrous material in the form of windings can be adhesively adhered to the belt and the belt used on both sides for abrasive operations. The belt which has served as a core, after use, may be rewound repeatedly.

Figure 12:
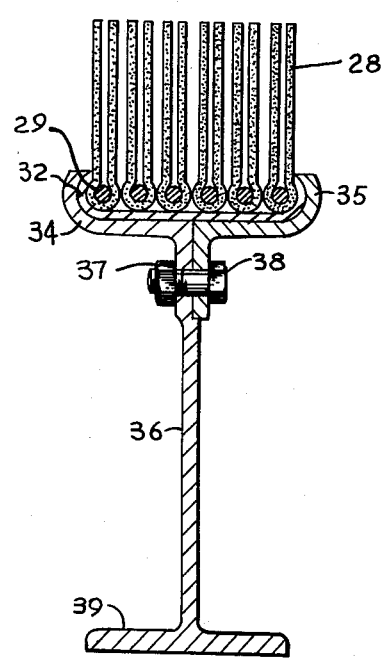
Figure 12 is an axial sectional view through the radius of a buff or set-up wheel made according to a further modification of the present invention.

Figures 12 and 13 show a still further modification of the present invention and illustrate how the present invention can be utilized to make a torus wound buffing wheel or set-up wheel from a number of individual toroidally wound sectors, each one of which is constructed of a premolded reinforced cording composed of abrasive-included fibrous sheet material. Figures 14 and 15 depict the structural details of a single toroidally wound sector of such a wheel and which is formed by toroidally winding a premolded cord 28 of abrasive-included fibrous sheet material about a temporary annular core member (which is not shown in the figures) and an inner annular reinforcing ring 29. The cord 28 is composed of an abrasive-included fibrous body 30 which has been previously molded about an inner reinforcing filament 31 which can consist of any filamentary substance such as glass fiber cording, nylon filaments, fine wire, cotton threads or other filament, cord or ribbon material. After the toroidally wound units have been made the windings of cord are severed at the outer periphery and the temporary core removed in the manner previously described for making the modifications of wheels already set forth. The resulting torus sector may or may not be molded at the inner periphery to compress the material about the retaining ring 29 and as can be seen in the figures of the drawing consists of a plurality of radially extending abrasive elements 28 of cord-like or filamentary form looped about a retaining ring and spaced one from another any required amount depending upon the spacings between the contiguous windings of the toroidally wound material. After having made a number of such individual sectors, a buffing or set-up wheel of the type shown in Figures 12 and 13 is made by assembling a plurality of such sectors in axial alignment and mounting them in an annular steel clip or assembly retainer 32 which is in turn placed between clamping rings 34 and 35, the former of which is a part of and the latter of which is bolted to a rotor flange 36 by means of clamping bolts 37 and 38. The rotor flange 36 is provided with an inner shoulder 39 suitable for mounting upon a shaft or spindle for operation.

A modified form of buffing or set-up device can be made following the general principles of construction described and shown for the wheel depicted in Figures 12 and 13 but in which the device is suitable for internal buffing operations by modifications of construction wherein the retaining ring 29 is positioned at the outer periphery of the annular toroidally wound sector and the torus wound unit severed about the inner periphery so that the free ends of the abrasive cord-like filaments extend radially inward from an outer ring which is then mounted in a suitable surrounding retaining ring leaving the internal periphery of the device available for polishing or buffing operations.

It should be apparent from the above description that the present invention is subject to many modifications within the scope of its teachings. For example, while the core member has been usually shown as substantially round in character the core may be hexagonal on the inside and circular at the outer periphery or vice versa, or the core may be generally circular with the outside of the core provided with teeth as in the case of a saw. Generally speaking, the final shape of the article can be given most any configuration desired depending upon the configuration of the core member and/or the contour of the mold used to compress the toroidally wound material. To sum up the present invention it can be stated that it provides a manner of making innumerable shapes of abrasive bodies composed of abrasive-included fibrous sheet material without waste of material and with the full utilization of the abrasive-included base stock by first toroidally winding the material about a suitable core which may be either permanent or temporary after which the material by reason of its plastic character under heat and pressure can be molded to conform to the desired shape.

Having described the invention it is desired to claim:

1. A rotary abrading device comprising a pair of arbored flanges and an abrasive element engaged therebetween comprising an annular, compressed body of toroidal windings of abrasive-containing fibrous strip material reinforced by a wire ring embedded within said body adjacent the inner periphery thereof.

2. A rotary abrading device comprising an annular compressed body of abrasive-containing fibrous sheet material in the form of a plurality of overlapping segments of toroidal windings of strips of said sheet material, said annular body being reinforced by an annular metallic element embedded within said body adjacent the inner periphery thereof.

3. A rotary abrading device comprising an annular, compressed body of toroidal windings of abrasive-containing fibrous strip material reinforced by a wire ring embedded within said body adjacent the inner periphery thereof, said body having a continuous annular mounting shoulder on each lateral surface of the body.

4. A rotary abrading device comprising an annular compressed body of abrasive-containing fibrous sheet material composed of several units bonded together, each of said units being in the form of a plurality of overlapping segments of toroidal windings of strips of said sheet material, said annular body being reinforced by a wire ring embedded within said body adjacent the inner periphery thereof.

5. An abrasive ring composed of a plurality of toroidal windings of abrasive-included fibrous sheet material compressed and adhesively united to form a compact solid body.

6. An abrasive ring composed of a plurality of toroidal windings of abrasive-included fibrous sheet material compressed and adhesively united to form a compact solid body, said ring containing an annular reinforcing element embedded within said body adjacent the inner peripheral portion thereof.

7. An abrasive ring composed of a plurality of toroidal windings of abrasive-included fibrous sheet material compressed and adhesively united to form a compact solid body, said ring containing reinforcing elements embedded within said body.

8. A rotary abrading device comprising an annular body of abrasive-containing fibrous sheet material in the form of a plurality of overlapping segments of toroidal windings of strips of said sheet material, said annular body being compressed about its inner periphery to form a mounting portion, the remainder of said annular body being uncompressed.

9. A method of making a rotary abrasive device from abrasive-included fibrous sheet material which comprises slitting an abrasive-included fibrous sheet material into long, narrow continuous strips, placing a wire ring in position against the inner periphery of a divided annular core member, toroidally winding said strips of the abrasive-included fibrous sheet material about said wire and core member, severing the toroidally wound material circumferentially about the outer periphery of the resulting toroidally wound unit, removing the core therefrom, placing the remainder of the assembly in a mold and subjecting to heat and pressure to compress the toroidally wound strip material into a compact abrasive body of annular shape.

10. A method of making a rotary abrasive device from abrasive-included fibrous sheet material which comprises slitting an abrasive-included fibrous sheet material into long, narrow continuous strips, placing a wire ring in position against the inner periphery of a divided annular core member, toroidally winding a plurality of plies of the abrasive-included fibrous strip material about said wire and core member, severing the toroidally wound material circumferentially about the outer periphery of the resulting toroidally wound unit, removing the core therefrom, placing the remainder of the assembly in a mold and subjecting to heat and pressure to compress the toroidally wound strip material into a compact abrasive body of annular shape.

11. A method of making a rotary abrasive device from abrasive-included fibrous sheet material which comprises slitting an abrasive-included fibrous sheet material into long, narrow continuous strips, placing a wire ring in position against the inner periphery of a divided annular core member, toroidally winding said strips of the abrasive-included fibrous sheet material about said wire and core member, severing the toroidally wound material circumferentially about the outer periphery of the resulting toroidally wound unit, removing the core therefrom, placing a plurality of such thusly formed units in superimposed relation in a mold and subjecting them to heat and pressure to compress the toroidally wound strip material into a compact abrasive body of annular shape.

12. A method of making a rotary abrasive device from abrasive-included fibrous sheet material which comprises slitting an abrasive-included fibrous sheet material into long, narrow continuous strips, assembling a temporary annular core member and a reinforcing ring member in juxtaposition, toroidally winding said strips of the abrasive-included fibrous sheet material about said wire and core member, severing the toroidally wound material circumferentially about the outer periphery of the resulting toroidally wound unit, removing the core therefrom, placing the remainder of the assembly in a mold and subjecting to heat and pressure to compress the toroidally wound strip material into a compact abrasive body of annular shape.

13. A method of making a rotary abrasive device from abrasive-included fibrous sheet material which comprises slitting an abrasive-included fibrous sheet material into long, narrow continuous strips, placing a wire ring in position against the inner periphery of a divided annular core member, toroidally winding said strips of the abrasive-included fibrous sheet material about said wire and core member, severing the toroidally wound material circumferentially about the outer periphery of the resulting toroidally wound unit, removing the core therefrom, placing the remainder of the assembly in a mold and compacting the toroidally wound material into a compact abrasive body of annular shape.

14. A method of making a rotary abrasive device from abrasive-included fibrous sheet material which comprises slitting an abrasive-included fibrous sheet material into long, narrow continuous strips, toroidally winding said strips of the abrasive-included fibrous sheet material about an annular core member and a reinforcing element of annular form, placing the toroidally wound material in a mold and subjecting to heat and pressure to compress the toroidally wound strip material into a compact abrasive body of annular shape.

15. A method of making an abrasive article from abrasive-included fibrous sheet material which comprises slitting an abrasive-included fibrous sheet material into long, narrow continuous strips, toroidally winding said strips about a core member, slitting said windings and removing the core member therefrom, placing the toroidally wound material in a mold and subjecting to heat and pressure to compress the toroidally wound strip material into a compact abrasive body.

16. A method of making an abrasive article from abrasive-included fibrous sheet material which comprises slitting an abrasive-included fibrous sheet material into long, narrow continuous strips, toroidally winding said strips about a core member, placing the toroidally wound material in a mold and subjecting to heat and pressure to compress the toroidally wound strip material into a compact abrasive body.

17. An abrasive article comprising a compressed body of toroidal windings of abrasive-containing fibrous strip material.

18. A method of making an abrasive article from abrasive-included fibrous sheet material which comprises slitting an abrasive-included fibrous sheet material into long, narrow continuous strips, toroidally winding said strips about a core member, and compacting at least a portion of said toroidally wound material.

References Cited in the file of this patent

UNITED STATES PATENTS

| Number | Name | Date |
| --- | --- | --- |
| 463,129 | Yates | Nov. 10, 1891 |
| 1,023,807 | Brinkman | Apr. 23, 1912 |
| 1,769,145 | Kranz et al. | July 1, 1930 |
| 2,099,777 | Thomas | Nov. 23, 1937 |
| 2,267,850 | Ushakoff | Dec. 30, 1941 |
| 2,316,161 | Harvey | Apr. 13, 1943 |
| 2,328,998 | Radford | Sept. 7, 1943 |
| 2,355,667 | Melton et al. | Aug. 15, 1944 |
| 2,378,386 | Baumgartner | June 19, 1945 |
| 2,383,519 | Sharpe | Aug. 28, 1945 |
| 2,388,867 | Peterson | Nov. 13, 1945 |
| 2,405,524 | Sharpe et al. | Aug. 6, 1946 |
| 2,489,193 | Mockiewicz | Nov. 22, 1949 |
| 2,556,044 | Sandman et al. | June 5, 1951 |
| 2,609,642 | Peterson | Sept. 9, 1952 |
| 2,642,705 | Jensen | June 22, 1953 |